United States Patent
Fan et al.

(10) Patent No.: US 10,574,661 B2
(45) Date of Patent: Feb. 25, 2020

(54) METHOD AND SYSTEM FOR PREVENTING UNAUTHORIZED ACCESS TO SMART CARD DEVICES IN A REMOTE DESKTOP INFRASTRUCTURE

(71) Applicant: VMware, Inc., Palo Alto, CA (US)

(72) Inventors: Jianming Fan, Beijing (CN); Zhimin Li, Beijing (CN)

(73) Assignee: VMware, Inc., Palo Alto, CA (US)

( * ) Notice: Subject to any disclaimer, the term of this patent is extended or adjusted under 35 U.S.C. 154(b) by 135 days.

(21) Appl. No.: 15/254,827

(22) Filed: Sep. 1, 2016

(65) Prior Publication Data

US 2018/0063185 A1 Mar. 1, 2018

(51) Int. Cl.
*H04L 29/06* (2006.01)

(52) U.S. Cl.
CPC ............ *H04L 63/102* (2013.01); *H04L 63/10* (2013.01); *H04L 63/1416* (2013.01); *H04L 63/1441* (2013.01)

(58) Field of Classification Search
CPC . H04L 63/1416; H04L 63/1441; H04L 63/10; H04L 63/102
See application file for complete search history.

(56) References Cited

U.S. PATENT DOCUMENTS

| | | | | |
|---|---|---|---|---|
| 6,920,500 | B2 * | 7/2005 | Surloff ................... | G06F 3/021 709/227 |
| 8,135,849 | B2 * | 3/2012 | Curtis ................... | H04L 63/105 709/228 |
| 9,526,008 | B2 * | 12/2016 | Prabdial ................. | H04W 8/04 |
| 9,628,469 | B2 * | 4/2017 | Wilkinson ............ | G06F 21/335 |
| 10,050,957 | B1 * | 8/2018 | Farrugia ............. | H04L 63/0853 |
| 10,404,678 | B2 * | 9/2019 | Grajek ................ | H04L 63/0815 |
| 2006/0020705 | A1 * | 1/2006 | Paek ........................ | H04L 69/16 709/228 |
| 2013/0227668 | A1 * | 8/2013 | Mocanu .................. | G06F 21/41 726/8 |

(Continued)

OTHER PUBLICATIONS

Jung, Jaewook, Woongryul Jeon, and Dongho Won. "An enhanced remote user authentication scheme using smart card." Proceedings of the 8th International Conference on Ubiquitous Information Management and Communication. (p. 62). ACM, 2014. (Year: 2014).*

(Continued)

*Primary Examiner* — Kari L Schmidt
(74) *Attorney, Agent, or Firm* — Patterson + Sheridan, LLP (57) ABSTRACT

The disclosure provides an approach for permission checking in virtualized desktop infrastructure (VDI) redirection so that only a rightful owner can access a smart card device. When a user logs in to a remote desktop via a VDI client, a service to access the smart card device is notified of the log in event and the user's account identifier. The service changes ownership and access permissions of a domain socket file used by processes to communicate with the service so only the user account owns and has permission to access the domain socket. The service may also bind, listen to, and receive requests from the domain socket to check users who have opened the domain socket file. In response, the service may determine processes that have opened the file and associated user accounts, as well as generate warnings and/or terminate processes which are not authorized to access the domain socket.

20 Claims, 4 Drawing Sheets

(56) References Cited

U.S. PATENT DOCUMENTS

| | | | |
|---|---|---|---|
| 2015/0180829 A1* | 6/2015 | Yu | G06F 21/31 |
| | | | 726/11 |
| 2016/0234286 A1* | 8/2016 | Fausak | H04L 67/025 |
| | | | 709/219 |
| 2018/0115613 A1* | 4/2018 | Vajravel | H04L 67/141 |

OTHER PUBLICATIONS

P. Urien, "An OpenID Provider Based on SSL Smart Cards," 2010 7th IEEE Consumer Communications and Networking Conference, Las Vegas, NV, 2010, pp. 1-2. (Year: 2010).*

* cited by examiner

METHOD AND SYSTEM FOR PREVENTING UNAUTHORIZED ACCESS TO SMART CARD DEVICES IN A REMOTE DESKTOP INFRASTRUCTURE

BACKGROUND

Remote desktop products such as VMware® Horizon View™ allow users to remotely access virtual computing environments or "desktops." Traditionally, the two main architectures used to enable access to remote desktops are remote desktop session host (RDSH) and virtual desktop infrastructure (VDI). In the case of RDSH, when multiple users log in to a remote desktop simultaneously via remote desktop clients, devices such as universal serial bus (USB) and smart card devices that are attached to the clients are redirected to the remote desktops, but such devices are inaccessible to other users due to RDSH's session isolation design. In the VDI case, one user is allowed to log in to the remote desktop via a client, and other users are allowed to log in via secure shell (SSH). However, devices, such as smart card devices, that are attached to the VDI client are redirected to the remote desktop as if those devices are local devices, which the other users who log in via SSH can access. This permits other users with malicious intentions to access a smart card's information and attack the smart card. For example, one of the other users may attack the smart card by inputting a wrong personal identification number (PIN) multiple times, causing the smart card to automatically lock itself.

SUMMARY

A method is provided for preventing unauthorized access to a smart card device in a virtual desktop infrastructure (VDI). The method generally includes determining that a user account has logged in to a remote desktop from a client device, where the remote desktop enables device redirection to the smart card device connected to the client device. The method further includes changing ownership and access permissions of a domain socket file to the user account that has logged in, where the domain socket file is used to communicate with a service which provides access to the smart card device. In addition, the method includes, responsive to a request by a process to establish a connection with the service: determining a user account associated with the process, and establishing the connection if the user account associated with the process has permission to access the domain socket file.

Further embodiments of the present invention include a non-transitory computer readable storage medium that includes instructions that enable a processing unit to implement one or more aspects of the above method, as well as a computer system configured to implement one or more aspects of the above method.

DETAILED DESCRIPTION

Embodiments presented herein add permission checking to virtual desktop infrastructure (VDI) device redirection so that only the rightful owner of a smart card can access a smart card device. As used herein, "smart card device" refers to a smart card reader, and it is assumed that a smart card has been inserted into the smart card reader. When a user logs in to a remote desktop via a VDI client, a service used to communicate with the smart card device, which reads to and writes from the smart card itself responsive to commands from the service, is notified of the log in event and the user's account identifier (ID). In response, the smart card communication service changes ownership and access permissions of a domain socket file used by processes to communicate with the service so that only the user account owns and has permission to access the domain socket file. Processes owned by other user accounts will then be unable to see or connect to the smart card communication service, as those processes cannot access the domain socket file. In another embodiment, the smart card communication service binds, listens to, and receives requests from the domain socket to check users who have opened the domain socket file. In response to such requests, the smart card communication service executes a script to determine the processes that have opened the domain socket file and user accounts associated with those processes. The smart card communication service may then terminate processes which belong to users who are not authorized to access the domain socket file and/or generate a warning that is displayed to an administrator.

Figure 1:
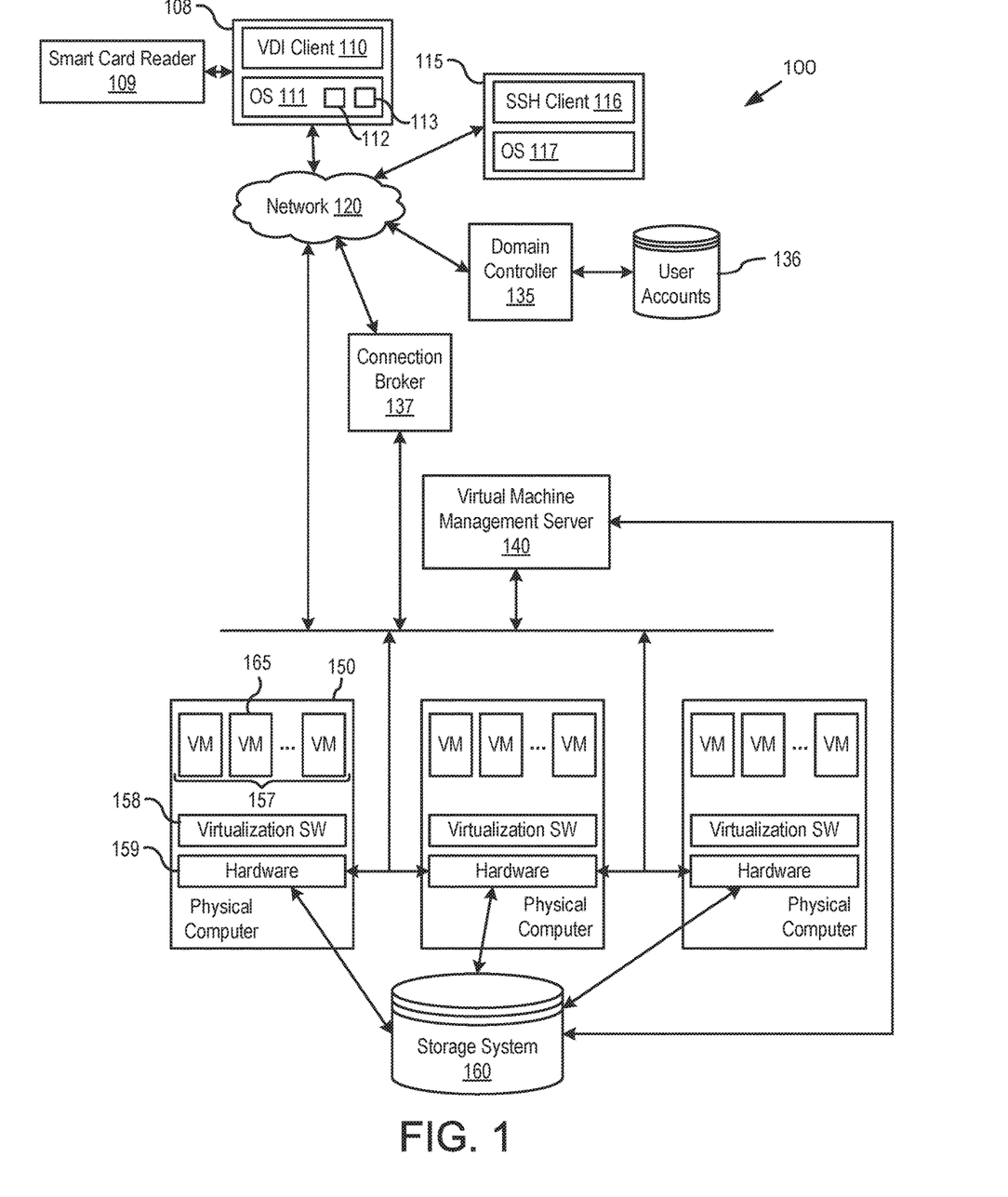
FIG. 1 illustrates components of a virtualized desktop infrastructure (VDI) system in which one or more embodiments of the present invention may be implemented.

FIG. 1 illustrates components of a VDI system 100 in which one or more embodiments of the present invention may be implemented. In VDI system 100, VDI client software programs (also referred to as "VDI clients" for short), e.g., VDI client 110, run on operating systems of local computing devices, e.g., client machine 108 on top of an operating system (OS) 111. VDI clients provide an interface for users to access their desktops, which may be running in one of virtual machines (VM) 157 or blade server (not shown) in a data center that is remote from the user locations. The term, "desktop" refers to the instance of an interactive operating environment provided by a computer operating system and software applications, typically in the form of a display and sound output and keyboard and mouse input. With VDI clients, users can access desktops running in a remote data center through network 120, from any location, using a general purpose computer running a commodity operating system and a VDI client software program such as VMware® View™, or using a special purpose thin client such as those available from Dell, HP, NEC, Sun Microsystems, Wyse, and others.

VDI system 100 includes a domain controller 135, such as Microsoft® Active Directory®, that manages user accounts 136 including user log-in information, and a connection broker 137 that manages connections between VDI clients and desktops running in VMs 157 or other platforms. Domain controller 135 and connection broker 137 may run on separate servers or in separate VMs running on the same server or different servers. VMs 157 are instantiated on a plurality of physical computers 150, each of which includes virtualization software 158 and hardware 159, are controlled by a VM management server 140, and are coupled to a shared persistent storage system 160 which may persistently store data commonly used between VMs 157. Virtualization software 158 runs on hardware 159 of host systems 150 and "creates" VMs 157 for use by, for example, client device 108. More specifically, virtualization software 158 creates a virtualized version of a hardware computer by interfacing with hardware 159 and presenting to users of VM 165 an interface that appears to be an actual computer.

All of the components of VDI system 100 communicate via network 120. For simplicity, a single network is shown but it should be recognized that, in actual implementations, the components of VDI system 100 may be connected over the same network or different networks. Furthermore, a particular configuration of the virtualized desktop infrastructure is described above and illustrated in FIG. 1, but it should be recognized that one or more embodiments of the present invention may be practiced with other configurations of the virtualized desktop infrastructure.

A user is permitted to sign on to a remote desktop via client device 108. User credentials that are used for sign on may be user account and password when password authentication is used, and user principal name on a smart card certificate and a smart card PIN when smart card authentication is used. In the smart card embodiment, a smart card reader device 109 is connected to client machine 108, and when the user's smart card is inserted into smart card reader device 109, a user interface for inputting a smart card PIN is displayed to the user. Client machine 108 gains access to the certificates stored in the smart card only when the correct smart card PIN is entered. In addition to logging in, the smart card may be used to provide digital signatures.

To sign on, a user logs in to client machine 108 by entering credentials. The user credentials are gathered by a component (such as authentication module 112) of OS 111 executing on client machine 108, which logs the user in. For security purposes, authentication module 112 may store the gathered credentials in a protected cache accessible only by processes that hold a trusted computing base privilege, such as system service 113.

Once logged in to client machine 108, the user launches VDI client 110, which, as described above, provides an interface to a desktop executing in a VM 165. VDI client 110 may allow a user to perform a "single sign on," which allows sign on to both VDI client 110 and to operating system 208 executing the requested desktop in VM 165 with the user providing credentials only a single time (as opposed to multiple times). A user may indicate whether the user wishes to use the single sign on technique via user interface elements presented by VDI client 110 such as a check box. An administrator may disable the single sign on technique. If single sign on is selected, the user need not re-enter credentials when client machine 108 connects to the desktop.

VDI client 110 utilizes a connection broker 137 to log on to a desktop. To ensure that connection broker 137 is authorized to receive and retransmit user credentials, client device 108 authenticates connection broker 137 by verifying with domain controller 135 that connection broker 137 is authorized to delegate credentials from client device 108 to a desktop executing in a VM 165.

Once connection broker 137 is authenticated, client device 108 communicates with domain controller 135 via connection broker 137 to authenticate the credentials for the user. Connection broker 137 exchanges messages with domain controller 135 to authenticate the user credentials. This message exchange may be performed in a secure manner, such as by using a hashed version of the password that was registered by the user that is maintained by domain controller 135 in user accounts 136. If connection broker 137, cooperating with domain controller, determines that the credentials entered are not correct, then authentication fails. A user may reenter credentials or may stop the authentication procedure. If connection broker 137 and domain controller 135 determine that the credentials are correct, then access is granted.

After access is granted and connection broker 137 is authenticated, client device 108, connection broker 137, and domain controller 135, cooperate to connect the client device 108 to a desktop executing on a VM 165 and to log the user onto that desktop. This is achieved by forwarding user credentials to the VM for logging on to the guest operating system running therein.

A similar process may be used to connect another client device 114 with a secure shell (SSH) client 115 to VM 165 and log another user onto the same remote desktop. It should be understood that traditional VDI allows a single user to be logged in via a VDI client such as VDI client 110 and multiple other users to log in via SSH such as via SSH client 115. As discussed in greater detail below, unauthorized access to a smart card device by such users who log in via SSH may be prevented in one embodiment by changing a domain socket file's ownership and permissions to block connections to a smart card communication service from processes whose users do not have permission to access the domain socket file, and by checking user accounts associated with processes that open the domain socket file at runtime.

Figure 2:
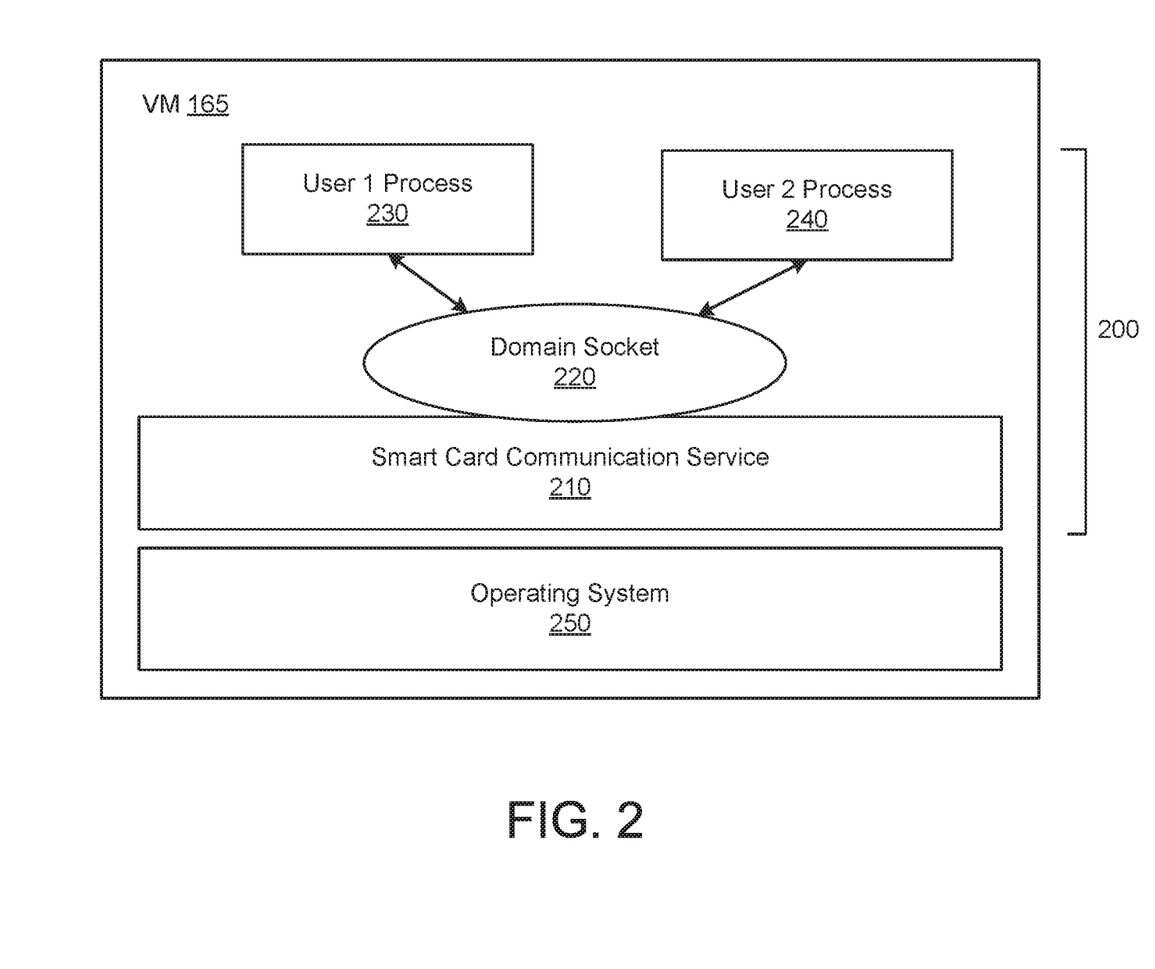
FIG. 2 is a more detailed illustration of a virtual machine (VM) of the VDI of FIG. 1, showing the software stack for a smart card device, according to an embodiment.

FIG. 2 is a more detailed illustration of VM 165 of VDI system 100 in FIG. 1, showing a software stack 200 for a smart card device, according to an embodiment. As shown, a service 210 to access a smart card device and processes 230 and 240 run on an OS 250 in VM 165. As discussed, service 210 may be used to issue commands to smart card device, which then reads to and writes from the smart card in response such commands. Although two processes 230 and 240 are shown, it should be understood that any number of processes 230 may run on OS 250. Illustratively, processes 230 and 240 belong to different user accounts which have logged in to OS 250. Each of processes 230 and 240 may communicate with smart card communication service 210 via a domain socket 220, which is a file provided by OS 250 for inter-process communication (IPC) between smart card communication service 210 and processes that need to access the smart card. In a particular embodiment, OS 250 may be Linux®, smart card communication service 210 may be a VDI pcsc daemon process, and domain socket 220 may be the Unix domain socket file /var/run/vdipcscd.

A security issue arises due to the device redirection function in VDI, which forwards functions of a physical device (e.g., a USB drive, etc.) connected to the user's client device (e.g., client device 108) to the remote desktop. Device redirection normally allows a user to connect the physical device to his or her client device, and the remote desktop is then able to see the physical device as though it were connected to the desktop, even though the desktop is actually in the cloud. Although device redirection is convenient for users, device redirection can cause a security problem when multiple users connect to the same remote desktop and device redirection inadvertently enables access to a physical device connected to one of the user's physical client device. Traditionally, smart card software stacks do not have permission checking to prevent such inadvertent access. In particular, the domain socket (e.g., domain socket 220) used to communicate with a service to access a smart card device is accessible to the world, so that any user who is logged in can see and access the smart card device via the domain socket. For example, user 202, who is logged in via SSH, would be able to access smart card device 109 attached to VDI client 110 that another user 201 uses to log in to the same remote desktop. This is the security issue, as user 202, who has unauthorized access to smart card device 109, can then access the information of the smart card inserted in the smart card device 109 and attack the smart card.

In one embodiment, smart card communication service 210 is configured to change the ownership and access permissions of domain socket file 220 to prevent such unauthorized access. As discussed in greater detail below, a log in management module of OS 250 monitors and records user accounts and IDs of users who log in to OS 250. The log in management module further notifies smart card communication service 210 of log in events and associated user account IDs, and, in turn, smart card communication service 210 changes the ownership and permissions of domain socket file 220 so that only the user account of a user who logs in via VDI client 110 owns and has permission to access the domain socket file. In another embodiment, smart card communication service 210 is further configured to bind, listen to, and receive requests from domain socket file 220 to check users who have opened domain socket file 220 at runtime. Responsive to such requests, smart card communication service 210 executes a script to determine the processes that have opened domain socket file 220 and the user accounts that own those processes, and terminates processes that have opened domain socket file 220 but are not authorized to do so and/or generates a warning that is displayed to an administrator.

Figure 3:
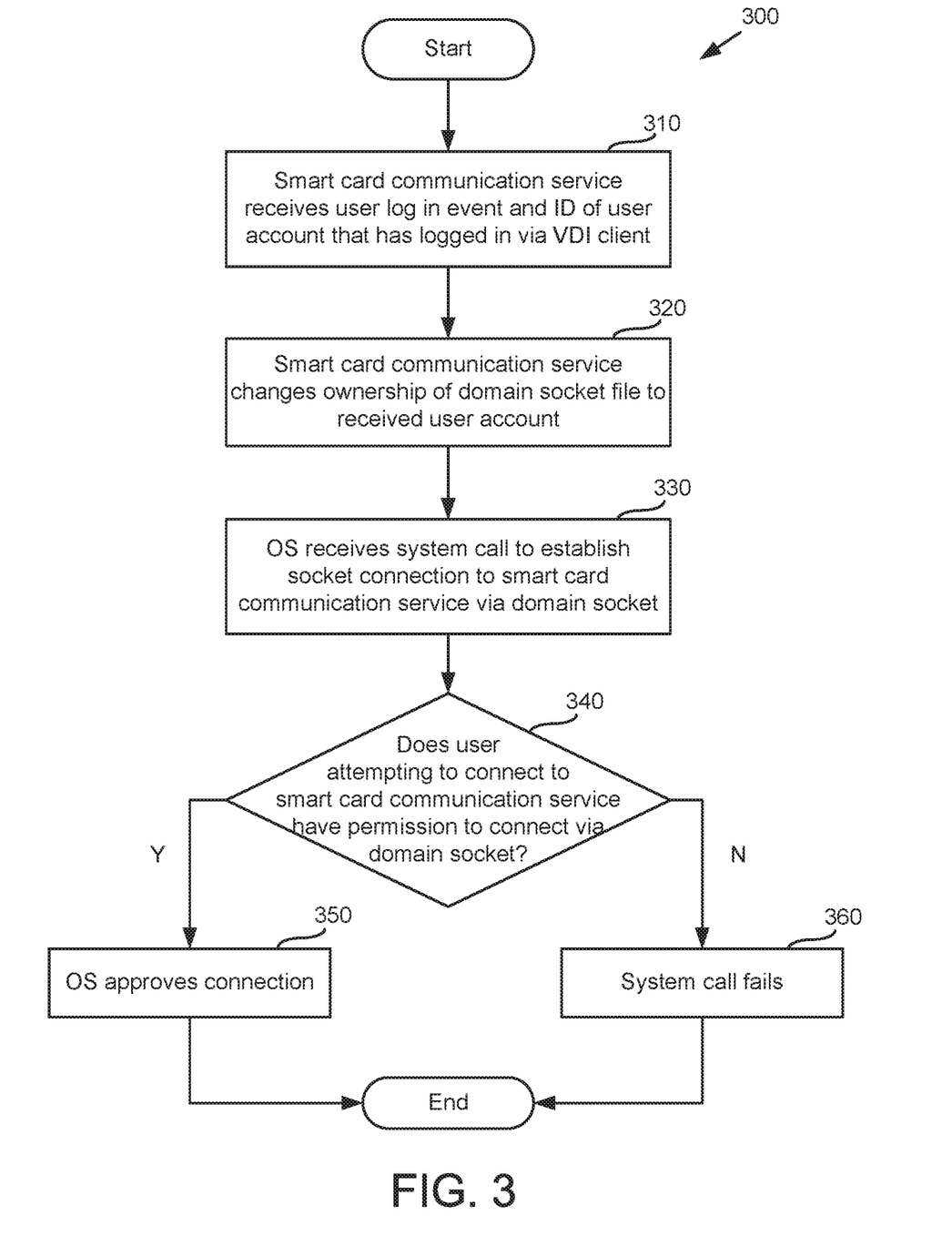
FIG. 3 illustrates a method for changing file permissions to block unauthorized connections to a smart card device, according to an embodiment.

FIG. 3 illustrates a method for changing file permissions to block unauthorized connections to a smart card device, according to an embodiment. As shown, method 300 begins at step 310, where smart card communication service 210 receives a user log in event and an ID of the user account that has logged in via VDI client 110. In one embodiment, a module of OS 250, such as a log in management module, monitors and records user accounts and IDs of users who log in to OS 250 via VDI client 110. In such a case, the OS 250 module may notify smart card communication service 210 of log in events and user account IDs associated with the log in events.

At step 320, smart card communication service 210 changes the ownership and access permissions of domain socket file 220 to the received user account. Doing so ensures that other normal users without root privileges have no right to access domain socket 220. In one embodiment, smart card communication service 210 may have the highest privilege and change the ownership and permissions of domain socket file 220 using user mode command(s). For example, in Linux®, the owner and group of domain socket 220 may both be changed to the user account (e.g., User1: User1, where the user account is User1). As a result, domain socket file 220 is both writable and readable for that user account, but neither writable nor readable for other user accounts. It should be understood that typically only one user may log in to a remote desktop via a VDI client at a time, and if a different user logs in, smart card communication service 210 may change the ownership and permissions of domain socket file 220 again to the different user's account.

At step 330, OS 250 receives a system call to establish a socket connection to smart card communication service 210 via domain socket 220. As discussed, processes attempting to access smart card device 109 do so through smart card communication service 210 provided by OS 250, and such processes communicate with smart card communication service 210 via domain socket 220. Continuing the Linux® example from above, the process attempting to access smart card device 109 may be an application linked with libpcscliste.so, which is a dynamic library that provides an application programming interface (API) that may invoked to communicate with smart card communication service 210, which may itself be a VDI pcsc daemon process.

At step 340, OS 250 determines whether the user attempting to connect to smart card communication service 210 has permission to connect via domain socket 220. OS 250 determines such permission based on ownership and access permissions of domain socket file 220. As discussed, domain socket file 220 may be made both writable and readable for the user account that owns domain socket file 220, but neither writable nor readable for other normal user accounts.

If OS 250 determines at step 340 that the user has permission to connect to smart card communication service 210 via domain socket 220, then OS 250 approves the connection at step 350. Thereafter, the process may write to and read from domain socket file 220 to communicate with smart accessing service 210 and access smart card device 109. On the other hand, if OS 250 determines at step 340 that the user does not have permission to connect to smart card communication service 210 via domain socket 220, then the system call fails at step 360 and the process is not permitted to write to or read from domain socket 220.

Figure 4:
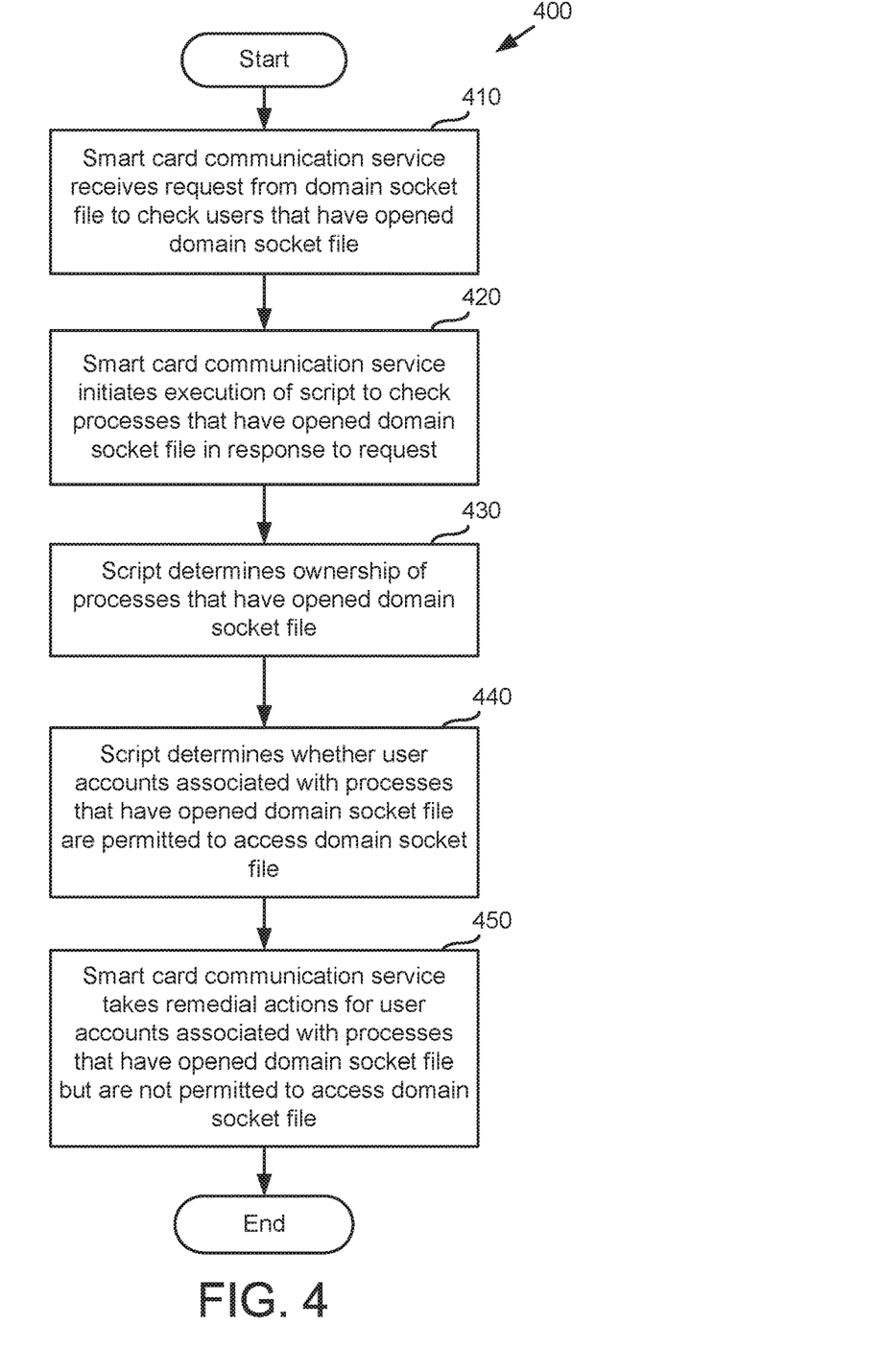
FIG. 4 illustrates a method for checking users who access a domain socket file during runtime, according to an embodiment.

FIG. 4 illustrates a method 400 for checking users who access a domain socket file during runtime, according to an embodiment. Method 400 is an optional second safeguard that may be performed in conjunction with method 300. As shown, method 400 begins at step 410, where smart card communication service 210 receives a request from domain socket file 220 to check the users that have opened domain socket file 220. In one embodiment, smart card communication service 210 is configured to, upon starting up when OS 250 starts up, bind and listen to the requests from domain socket file 220. For example, domain socket file 220 may periodically send requests to check users that have opened the file 220 so that smart card communication service 210 is able to continuously monitor connections to domain socket file 220.

At step 420, smart card communication service 210 executes a script to check the processes that have opened domain socket file 220 in response to the request from domain socket file 220. Continuing the Linux® example from above, smart card communication service 210 may use the command $netstat-apeen to check all processes that have opened the /var/run/vdipcscd domain socket file. In response to such a command, the Linux® OS will return a list which includes process IDs of those processes that have opened the /var/run/vdipcscd domain socket file.

At step 430, the script executed by smart card communication service 210 determines ownership of the processes that have opened domain socket file 220. For example, in Linux®, the following commands may be used to determine the ID and user name, respectively, of a user account that owns process "10046": #cat/proc/10046/loginuid and #cat/etc/passwd/grep 500.

At step 440, the script executed by smart card communication service 210 determines whether the user accounts associated with the processes that have opened domain socket file 220 are permitted to access domain socket file 220. For example, OS 250 may maintain a database that stores information on ownership of files including ownership of domain socket file 220, and the script may compare such ownership information to the owner of the processes that have opened domain socket file 220, as determined at step 430.

If smart card communication service 210 determines that one or more of the user accounts associated with the processes that have opened domain socket file 220 are not permitted to access domain socket file 220, then smart card communication service 210 takes remedial actions at step 450. In one embodiment, the remedial actions include generating a warning and displaying the warning on a display device so that an administrator is made aware of the unauthorized access of domain socket file 220. In another embodiment, the remedial actions may include terminating the processes that have opened domain socket file 220 but are associated with user accounts that do not have permission to access domain socket file 220.

Advantageously, techniques disclosed herein add permission checking to virtualized desktop infrastructure (VDI) redirection, thereby preventing unauthorized users from accessing smart card devices. Two safeguards are disclosed: changing a domain socket file's ownership and permission to block connections to a smart card communication service from processes whose users do not have permission to access the domain socket file, and checking the user accounts associated with processes that open the domain socket file at runtime and terminating unauthorized processes and/or generating a warning of such processes. As a result, a normal user without root privileges and who is not authorized to access the domain socket file cannot access the information of or attack the smart card.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces.

Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for preventing unauthorized access to a smart card device in a virtual desktop infrastructure (VDI), comprising:
    determining that a user account has logged in to an operating system (OS) of a remote desktop from a client device, the remote desktop enabling device redirection to the smart card device which is connected to the client device; and
    in response to determining that the user account has logged in to the OS, changing ownership and access permissions of a domain socket file to the user account that has logged in to the OS, the domain socket file being used to communicate with a service which provides access to the smart card device,
    wherein responsive to the OS receiving a request by a process running on the OS to establish a connection with the service which provides access to the smart card device, the OS performs operations including:
        determining a user account associated with the process, and
        establishing the connection if the user account associated with the process has permission to access the domain socket file.

2. The method of claim 1, further comprising:
    receiving, from the domain socket file, a request to check users that have opened the domain socket file;
    determining processes that have opened the domain socket file;
    determining user accounts associated with the processes that have opened the domain socket file; and
    taking remedial action responsive to determining that one of the user accounts associated with the processes that have opened the domain socket file is not permitted to access the domain socket file.

3. The method of claim 2, wherein the remedial action includes at least one of generating a warning and terminating the processes that have opened the file and are associated with the determined one of the user accounts.

4. The method of claim 2, wherein the domain socket file periodically sends requests to check users that have opened the domain socket file.

5. The method of claim 2, wherein:
    the steps of determining the processes and determining the user accounts are performed by a script which is triggered upon receiving the request; and
    the script further determines whether the user accounts are permitted to access the domain socket file.

6. The method of claim 1, wherein:
    the user account that has logged in to the OS of the remote desktop is logged in via a VDI client; and
    the user account associated with the process is logged in to the OS of the remote desktop via secure shell (SSH).

7. The method of claim 1, wherein determining the user account has logged in to the remote desktop includes receiving notification of a user log in event and an identifier (ID) of the user account that has logged in to the remote desktop.

8. The method of claim 1, wherein:
    the steps of determining the user account that has logged in and changing the ownership and permissions are performed by the service.

9. The method of claim 1, wherein the process communicates with the service by invoking an application programming interface (API) provided by a dynamic library.

10. A non-transitory computer-readable storage medium containing a program which, when executed by one or more processors, performs operations for preventing unauthorized access to a smart card device in a virtual desktop infrastructure (VDI), the operations comprising:
    determining that a user account has logged in to an operating system (OS) of a remote desktop from a client device, the remote desktop enabling device redirection to the smart card device which is connected to the client device; and
    in response to determining that the user account has logged in to the OS, changing ownership and access permissions of a domain socket file to the user account that has logged in to the OS, the domain socket file being used to communicate with a service which provides access to the smart card device,
    wherein responsive to the OS receiving a request by a process running on the OS to establish a connection with the service which provides access to the smart card device, the OS performs operations including:
        determining a user account associated with the process, and
        establishing the connection if the user account associated with the process has permission to access the domain socket file.

11. The non-transitory computer-readable storage medium of claim 10, the operations further comprising:
    receiving, from the domain socket file, a request to check users that have opened the domain socket file;
    determining processes that have opened the domain socket file;
    determining user accounts associated with the processes that have opened the domain socket file; and
    taking remedial action responsive to determining that one of the user accounts associated with the processes that have opened the domain socket file is not permitted to access the domain socket file.

12. The non-transitory computer-readable storage medium of claim 11, wherein the remedial action includes at least one of generating a warning and terminating the processes that have opened the file and are associated with the determined one of the user accounts.

13. The non-transitory computer-readable storage medium of claim 11, wherein:

the steps of determining the processes and determining the user accounts are performed by a script which is triggered upon receiving the request; and the script further determines whether the user accounts are permitted to access the domain socket file.

14. The non-transitory computer-readable storage medium of claim 11, wherein the domain socket file periodically sends requests to check users that have opened the domain socket file.

15. The non-transitory computer-readable storage medium of claim 10, wherein:

the user account that has logged in to the OS of the remote desktop is logged in via a VDI client; and the user account associated with the process is logged in to the OS of the remote desktop via secure shell (SSH).

16. The non-transitory computer-readable storage medium of claim 10, wherein determining the user account has logged in to the remote desktop includes receiving notification of a user log in event and an identifier (ID) of the user account that has logged in to the remote desktop.

17. The non-transitory computer-readable storage medium of claim 10, wherein:

the steps of determining the user account that has logged in and changing the ownership and permissions are performed by the service.

18. The non-transitory computer-readable storage medium of claim 10, wherein the process communicates with the service by invoking an application programming interface (API) provided by a dynamic library.

19. A system, comprising:

a processor;

a memory, wherein the memory includes a program executable in the processor to perform operations for preventing unauthorized access to a smart card device in a virtual desktop infrastructure (VDI), the operations comprising:

determining that a user account has logged in to an operating system (OS) of a remote desktop from a client device, the remote desktop enabling device redirection to the smart card device which is connected to the client device, and in response to determining that the user account has logged in to the OS, changing ownership and access permissions of a domain socket file to the user account that has logged in to the OS, the domain socket file being used to communicate with a service which provides access to the smart card device, wherein responsive to the OS receiving a request by a process running on the OS to establish a connection with the service which provides access to the smart card device, the OS performs operations including:

determining a user account associated with the process; and establishing the connection if the user account associated with the process has permission to access the domain socket file.

20. The system of claim 19, the operations further comprising:

receiving, from the domain socket file, a request to check users that have opened the domain socket file;

determining processes that have opened the domain socket file;

determining user accounts associated with the processes that have opened the domain socket file; and taking remedial action responsive to determining that one of the user accounts associated with the processes that have opened the domain socket file is not permitted to access the domain socket file.

* * * * *